March 31, 1942.  R. F. McMURRAY  2,277,922
HIGH PRESSURE SLIP COUPLING
Filed July 29, 1939   2 Sheets-Sheet 1
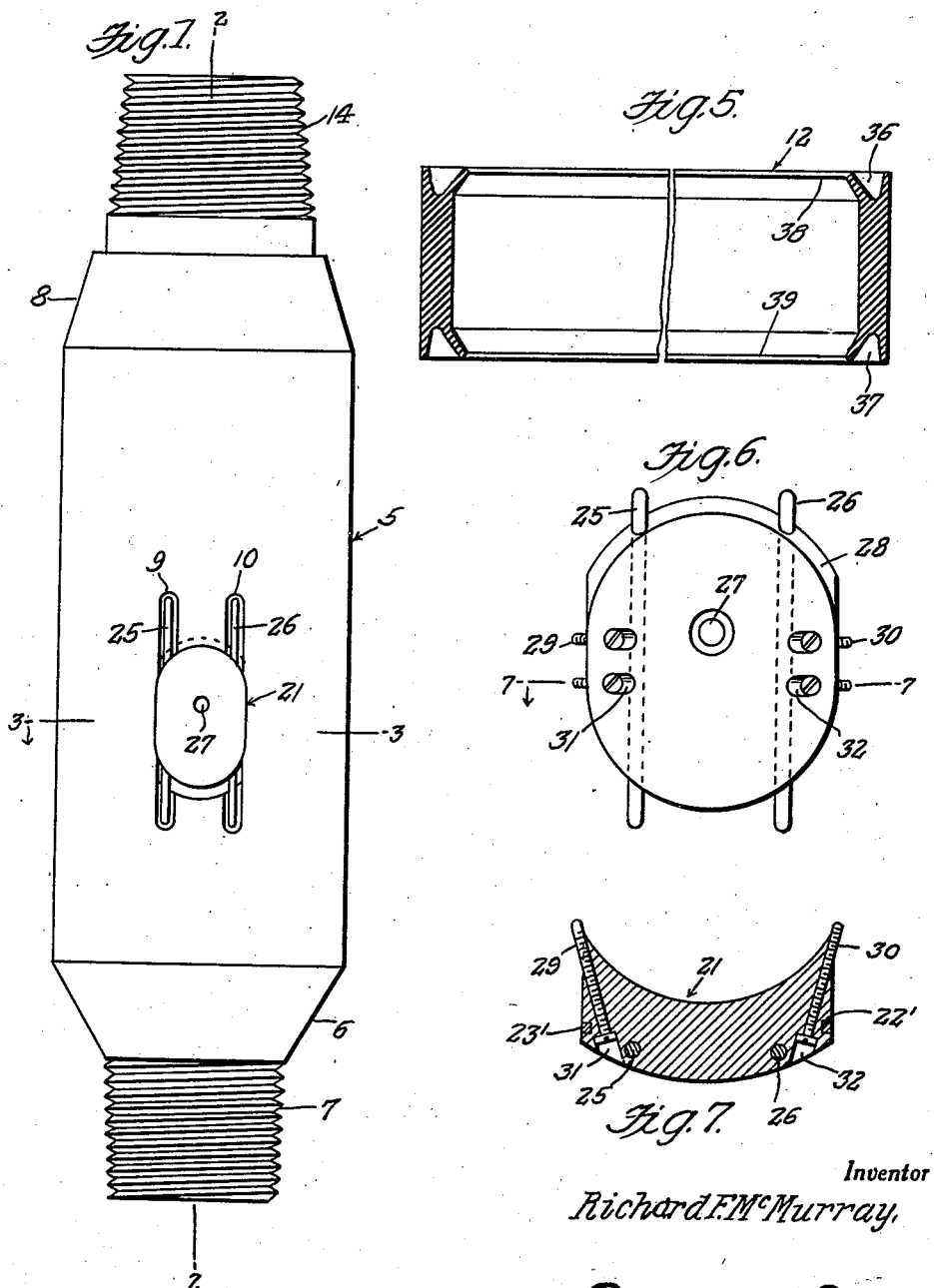

March 31, 1942.  R. F. McMURRAY  2,277,922
HIGH PRESSURE SLIP COUPLING
Filed July 29, 1939   2 Sheets-Sheet 2
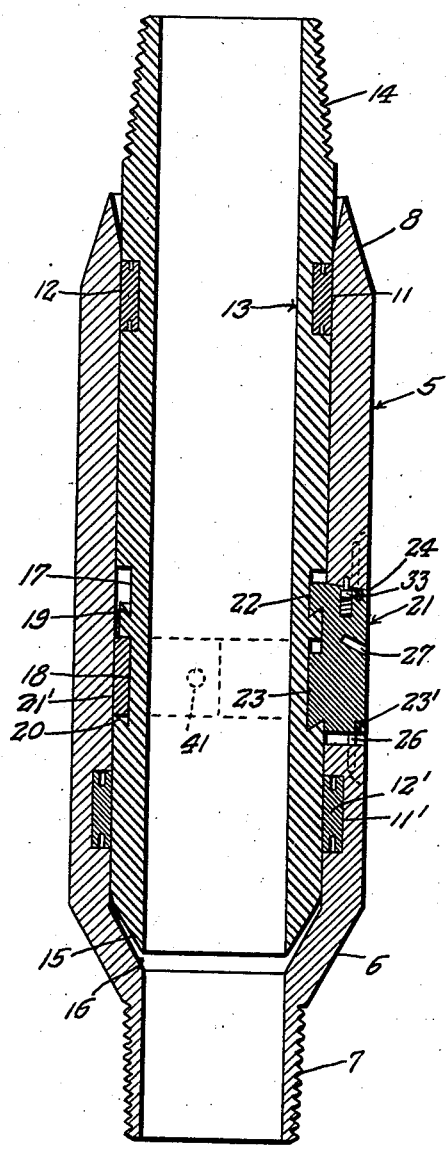
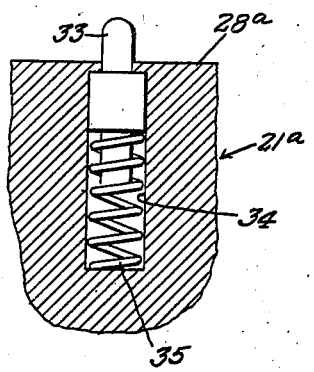
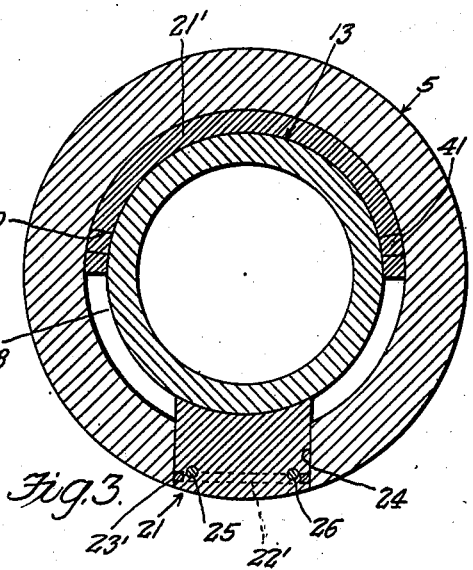
Inventor
Richard F. McMurray,
By Clarence A. O'Brien
and Hyman Berman
Attorneys Patented Mar. 31, 1942

2,277,922

UNITED STATES PATENT OFFICE 2,277,922

HIGH PRESSURE SLIP COUPLING

Richard F. McMurray, Oklahoma City, Okla.

Application July 29, 1939, Serial No. 287,381

5 Claims. (Cl. 285—168)

My invention relates generally to slip couplings for quick detachable connection of pipes, and particularly to a slip of this character which eliminates threaded joints between sections of pipe connected while withstanding unusually high internal and external pressures as in well drilling operations, and an important object of the invention is to provide arrangements of this character which substantially reduces the time required for re-runs, reduce the number of men required for the operation, and add greatly to the life of the tubing by eliminating the stresses and wear thereon caused by the frequent screwing and unscrewing characteristic of threaded joints and the like.

Other important objects and advantages of my invention will be apparent from a reading of the following description and the drawings wherein a preferred embodiment of the invention is shown for illustrative purposes.

In the drawings:

Figure 1 is a general side elevational view.

Figure 2 is a vertical transverse sectional view taken through Figure 1 approximately on the line 2—2 and looking toward the right in the direction of the arrow.

Figure 3 is an enlarged horizontal sectional view taken through Figure 1 downwardly in the direction of the arrow.

Figure 4 is an enlarged sectional detail.

Figure 5 is an enlarged transverse vertical sectional view through one of the compressible sealing rings showing the same in expanded condition.

Figure 6 is a top plan view of the lock block without a sealing ring.

Figure 7 is a horizontal sectional view taken through Figure 6 approximately on the line 7—7 and looking downwardly in the direction of the arrow, and showing employment of a sealing ring.

Referring in detail to the drawings, the numeral 5 generally designates the outer shell which is generally cylindrical in form and has the tapered portion 6 terminating in a tapered exteriorly threaded nipple 7, the upper end of the shell being beveled as indicated by the numeral 8. Intermediate the upper and lower ends of the shell, the side wall of the shell is formed exteriorly with two parallel vertically elongated slots 9 and 10. The inner wall of the shell is formed with upper and lower annular seats 11, 11' for the compressible material seal rings 12 and 12'. The bore of the shell 5 is tapered just enough to allow easy entrance of the inner shell 13.

The inner shell 13 is preferably made of stock tubing and has suitable threads 14 on its upper end, and is suitably beveled as indicated by the numeral 15 on its lower end to seat with respect to the beveled shoulder 16 on the interior of the outer shell 5. Intermediate the upper and lower ends thereof the exterior of the inner shell 13 is formed with lock grooves 17, 18, respectively, which have respective V-shaped bottoms 19, 20 as shown in Figure 2, for engagement by the projections on the lock block which is generally designated 21. These grooves hold the lock block from slipping out of engagement when the tubing catchers and anchors are being set, or should the string of tubing be let down too far on the bottom of the well. The lower land is relieved to compensate for any possible upset of supporting metal caused by the comparatively heavy load imposed. The upper hook land requires no relief, as it is smaller in diameter than the lower hook land. Small blocks or lugs 21' are welded to the inner shell 13 within the lower lock groove 18.

The lock block 21 is in the form of a segment cut from a ring having projections 22, 23, respectively, to match the respective grooves 17 and 18. The block is tapered on the circumference, the inner circumference being greater than the outer. This matches the taper in the port 24 in the side wall of the outer shell 5 in which the block 21 seats, and this taper allows the lock block to be withdrawn just far enough to clear the inner shell, to enable it to be pulled out of the outer shell. Transversely spaced stop pins 25 and 26 are arranged vertically through the block 21 and project beyond the upper and lower edges thereof and engage the upper and lower parts of the grooves 9 and 10 in the exterior of the wall of the outer shell 5 to prevent the block from falling or slipping into the interior of the outer shell 5 when the coupling is parted. The opening 27 in the outer face of the block 21 is arranged to receive a short pin or rod used to pick up and pull out the block and disengage it from the inner shell, this opening being upwardly inclined and chamfered at its entrance to facilitate insertion of the pin (not shown). The top 28 of the block 21 is tapered to cooperate with the taper in the top of the port 24 and cause an inthrust of the lock block so as to cause the coupling to wedge or tighten under load. This taper should be limited to not over five degrees as a greater taper would cause enough pressure to crush or collapse the inner shell on extremely long strings of tubing. Laterally angulated screws 29 and 30 arranged in pairs on the upper side of the block pass through pairs of recesses 31 and 32 in the outer face of the block and emerge just laterally outwardly of the inner edge of the block as shown in Figure 7, to hold the block in place. Where the device is used with corrosive or sand bearing fluids, the block 21 is provided circumferentially with a packing groove 22' in which a compressible sealing ring 23' is set to engage portions of the port 24.

In an alternative embodiment of the invention the block 21a has instead of the screws 29, 29 and 30, 30 a single spring-pressed detent 33 projecting from its top edge 28a to enter a conforming opening in the angulated top 24 of the opening in the outer shell so as to hold the block in place, the detent being mounted in an opening 34 in which works the expanding spring 35, as shown in Figures 2 and 4.

The seal rings 12 should in the case of their use in oil wells, be of oil-proof rubber or rubber substitute, so that when seated in the recess 11 and 11a they will effectively resist the internal pressure in the tubing. The seal rings 12 have in their upper and lower edges V-shaped grooves 36 and 37 tends to spread the sides of the grooves outwardly, thereby sealing tighter as the pressure increases. As the inner shell has a sliding fit in the outer shell, the sealing rings, taking the cold flow of rubber into consideration and the smaller annular space through which the rubber would have to be forced, terrific pressure is successfully resisted by the arrangement.

A lug 21' of slightly less thickness than the groove 18 but of substantially the same width as the groove 18, extends for a distance of not more than 180° in the groove 18, and is formed with holes accommodating spot welds 40 and 41 whereby the lug 21' is secured in place in the grooves 13. When the outer member 5 is turned relative to the inner member 13 in one direction the lock block 21 will engage one squared end of the lug 21' and will engage the opposite squared end of the lug 21' when turned in the opposite direction.

Although I have shown and described herein preferred embodiments of my invention, it is to be definitely understood that I do not desire to limit the application of my invention thereto, and any change or changes may be made in the structure and arrangement of the parts, within the spirit of the invention and the scope of the subjoined claims.

Having described the invention, what is claimed as new is:

1. A high pressure slip coupling comprising an outer barrel, an inner barrel telescoped in said outer barrel for rotary and longitudinal movement relative to said outer barrel, longitudinally spaced packing means sealing the barrels relative to each other, said inner barrel being formed with groove means defining at least one land with the upper surface of said land declining in a radially inward direction, said outer barrel being formed in its side wall between said packing means with a radial opening registrable with said land, the top of said opening being slanted in an opposite direction from the upper surface of the land, a floating locking block shorter than and positioned in said opening, said block having its upper end conformably slanted to and normally engaging the top of the opening whereby upward movement of said block in said opening forces the block through said opening in a radially inward direction toward said inner barrel, a radially inwardly extending projection on said block, said projection having its under surface beveled conformably with the upper surface of said land, and detent means holding said block in said opening while permitting limited vertical and radial movement of said block in said opening, whereby upward movement of said inner barrel relative to said outer barrel causes said block to thrust in a radially inward direction toward said inner barrel to securely interengage said projection with said land.

2. A high pressure slip coupling comprising an outer barrel, an inner barrel rotatably and slidably fitting the bore of said outer barrel, packings in said bore at the upper and lower ends thereof, circumferential land means formed on said inner barrel between said packings, said outer barrel being formed with an opening extending therethrough opposite said land means, a floating locking block seated in said opening, segmental projection means on the radially inward side of said block and slidably engaged with the upper face of said land means, and holding means permitting some radial and longitudinal movement of said block in said opening but preventing radially outward displacement of said block from said opening.

3. A high pressure slip coupling comprising an outer barrel, an inner barrel rotatably and slidably fitting the bore of said outer barrel, packings in said bore at the upper and lower ends thereof, circumferential land means formed on said inner barrel between said packings, said outer barrel being formed with an opening extending therethrough opposite said land means, a locking block seated in said opening, segmental projection means on the radially inward end of said block and slidably engaged with the upper face of said land means, and holding means permitting limited radial and vertical movement of said block in said opening but preventing radially outward displacement of said block from said opening, said holding means comprising adjustably extensible lateral stops projecting on the laterally inward end of said block, said stops engaging the sides of the inner end of said opening.

4. A high pressure slip coupling in accordance with claim 2 wherein the upper face of said land means slants radially inwardly and downwardly and the bottom of said segmental projection means slants radially outwardly and upwardly, said land means comprising a pair of vertically spaced lands and said segmental projection means comprising a pair of similarly vertically spaced segmental projections engaging the lands, the lower land and the lower segmental projection being radially wider than the upper land and upper segmental projection.

5. A high pressure slip coupling comprising an outer barrel, an inner barrel rotatably and slidably fitting the bore of said outer barrel, packings in said bore at the upper and lower ends thereof, circumferential grooves forming land means on said inner barrel between said packings, said outer barrel being formed with a radial opening extending through the sidewall and adapted to be positioned opposite said land means, a locking block seated in said opening, segmental means projecting from the radially inward side of said block and slidably engaged with the upper face of a part of said land means, and holding means permitting some radial movement of said block in said opening but preventing displacement of said block from said opening, said holding means comprising a vertically spring pressed detent on said block engaging in a depression formed in the top of said opening.

RICHARD F. McMURRAY.